US010826842B2

(12) United States Patent
Millin et al.

(10) Patent No.: US 10,826,842 B2
(45) Date of Patent: Nov. 3, 2020

(54) THIRD-PARTY NETWORK COMPUTING RESOURCE MANAGEMENT

(71) Applicant: ServiceNow, Inc., Santa Clara, CA (US)

(72) Inventors: Shaun James Millin, Tionesta, PA (US); Chowie Chunyan Lin, San Jose, CA (US); Ashok Ganesan, Milpitas, CA (US); Samujjwal Bhandari, Santa Clara, CA (US); Arjun Badarinath, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 449 days.

(21) Appl. No.: 15/958,347

(22) Filed: Apr. 20, 2018

(65) Prior Publication Data

US 2019/0327179 A1 Oct. 24, 2019

(51) Int. Cl.
*G06F 15/16* (2006.01)
*H04L 12/911* (2013.01)
(Continued)

(52) U.S. Cl.
CPC .......... *H04L 47/70* (2013.01); *H04L 41/0803* (2013.01); *H04L 41/0896* (2013.01);
(Continued)

(58) Field of Classification Search
CPC . G06F 2009/45587; G06F 2009/45591; G06F 2009/45595; G06F 9/45533; G06F 9/45558; G06Q 10/02; G06Q 10/04; G06Q 10/06; G06Q 10/0631; H04L 41/0803; H04L 41/0896; H04L 41/5029; H04L 41/5032; H04L 41/5096; H04L 43/0876; H04L 47/70
See application file for complete search history.

(56) References Cited

U.S. PATENT DOCUMENTS

2013/0232252 A1  9/2013 Huang et al.
2014/0297866 A1  10/2014 Ennaji et al.
(Continued)

OTHER PUBLICATIONS

Extended European Search Report for European Patent Application No. 19168704.5 dated Sep. 5, 2019; 9 pgs.

*Primary Examiner* — Normin Abedin
(74) *Attorney, Agent, or Firm* — Fletcher Yoder PC

(57) ABSTRACT

A remote network management platform may include a database containing records relating to units of reserved and on-demand computing resources provided by a third-party network and a processor disposed within a computational instance. The processor may be configured to obtain utilization reports regarding the managed network from the third-party network and calculate, for each hour-of-day across one or more days of usage, respective hourly average units of utilization, by the managed network, of the reserved and on-demand computing resources. The processor may also calculate output values respectively associated with different combinations of the reserved and on-demand computing resources that jointly satisfy the hourly average units of utilization and select an allocation of the reserved computing resources that is within a threshold of a minimum output value of the output values. The processor may further change the number of allocated units to be the selected allocation of reserved computing resources.

20 Claims, 17 Drawing Sheets

(51) Int. Cl.
*H04L 12/24* (2006.01)
*H04L 12/26* (2006.01)

(52) U.S. Cl.
CPC ...... *H04L 41/5029* (2013.01); *H04L 41/5032* (2013.01); *H04L 41/5096* (2013.01); *H04L 43/0876* (2013.01)

(56) References Cited

U.S. PATENT DOCUMENTS

2015/0106488 A1    4/2015   Plumelle et al.
2018/0107920 A1    4/2018   Jayaraman et al.

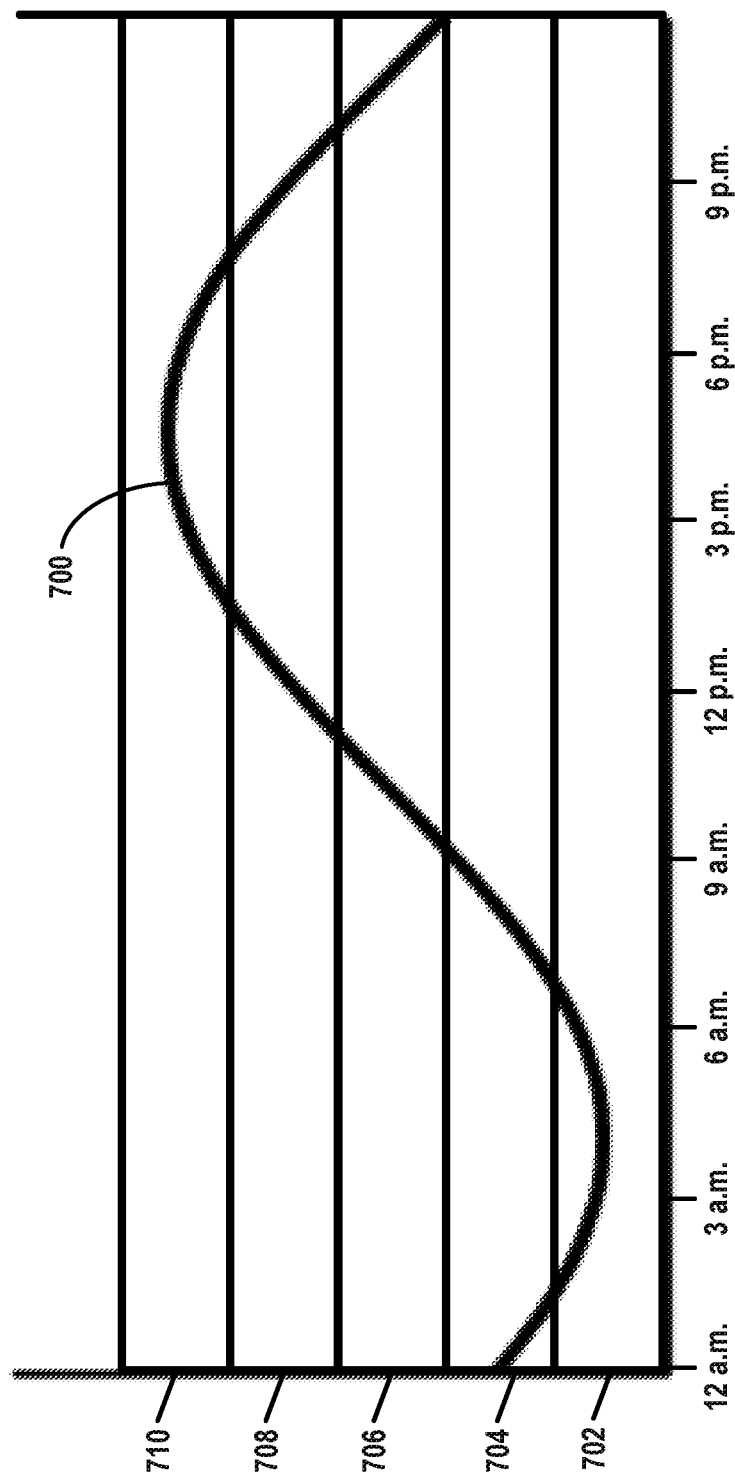

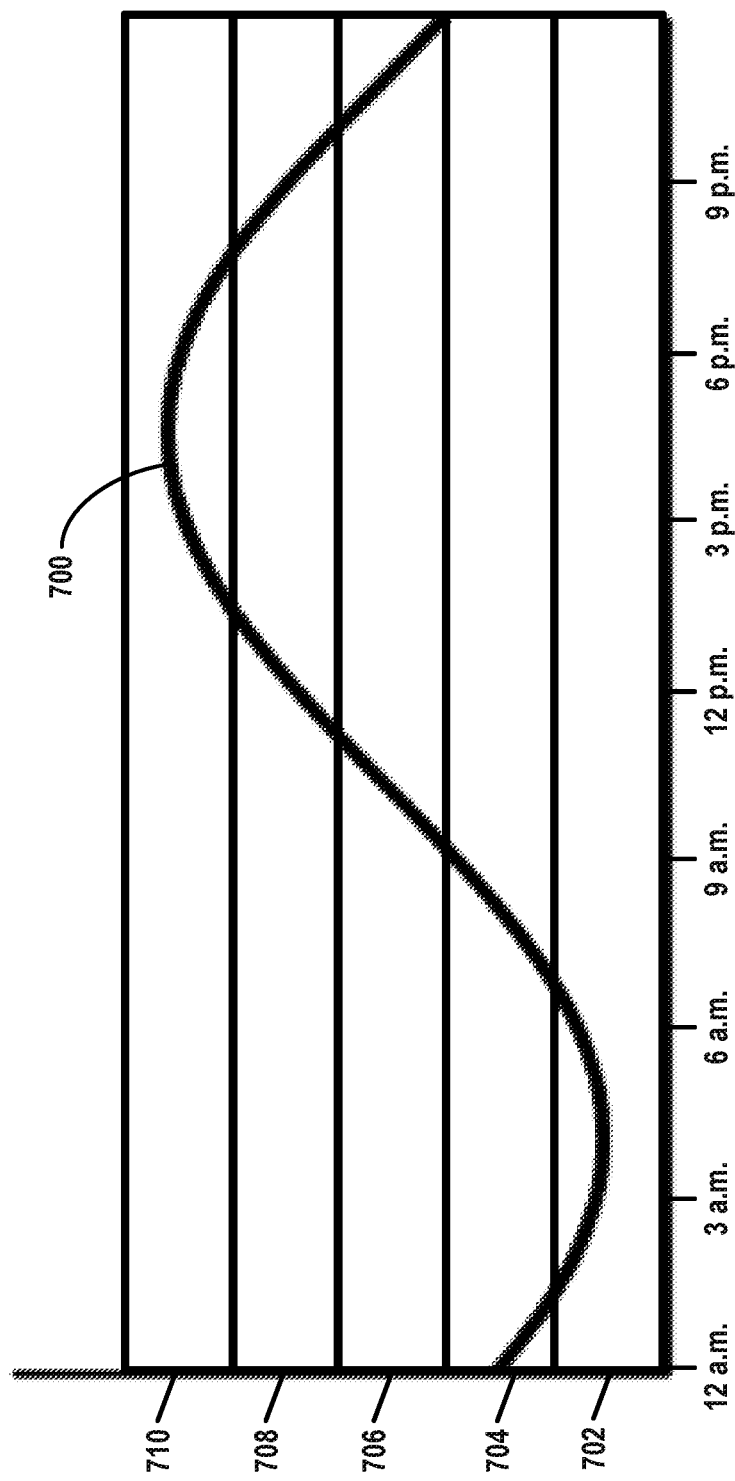

| HOUR | AVERAGE UNITS | C1 (RU = 0) | C2 (RU = 1) | C3 (RU = 2) | C4 (RU = 3) | C5 (RU = 4) | C6 (RU = 5) | C7 (RU = 6) | RU COST | ODU COST |
|---|---|---|---|---|---|---|---|---|---|---|
| 0 | 2.2 | 3 | 2 | 1 | 0 | 0 | 0 | 0 | $ 0.03 | $ 0.06 |
| 1 | 1.9 | 2 | 1 | 0 | 0 | 0 | 0 | 0 | | |
| 2 | 1.5 | 2 | 1 | 0 | 0 | 0 | 0 | 0 | | |
| 3 | 1.2 | 2 | 1 | 0 | 0 | 0 | 0 | 0 | | |
| 4 | 1 | 1 | 0 | 0 | 0 | 0 | 0 | 0 | | |
| 5 | 0.8 | 1 | 1 | 0 | 0 | 0 | 0 | 0 | | |
| 6 | 1.3 | 2 | 2 | 1 | 0 | 0 | 0 | 0 | | |
| 7 | 2.5 | 3 | 3 | 2 | 1 | 0 | 0 | 0 | | |
| 8 | 3.7 | 4 | 3 | 2 | 1 | 0 | 0 | 0 | | |
| 9 | 3.7 | 4 | 3 | 2 | 1 | 0 | 0 | 0 | | |
| 10 | 3.8 | 4 | 3 | 2 | 2 | 0 | 0 | 0 | | |
| 11 | 4.2 | 5 | 4 | 3 | 2 | 1 | 0 | 0 | | |
| 12 | 4.1 | 5 | 4 | 3 | 2 | 1 | 0 | 0 | | |
| 13 | 4.5 | 5 | 4 | 3 | 2 | 1 | 0 | 0 | | |
| 14 | 4.8 | 5 | 4 | 3 | 2 | 1 | 0 | 0 | | |
| 15 | 4.9 | 5 | 4 | 3 | 2 | 1 | 0 | 0 | | |
| 16 | 5 | 5 | 4 | 3 | 2 | 1 | 0 | 0 | | |
| 17 | 4.8 | 5 | 4 | 3 | 2 | 1 | 0 | 0 | | |
| 18 | 4.5 | 5 | 4 | 3 | 2 | 1 | 0 | 0 | | |
| 19 | 3.4 | 4 | 3 | 2 | 1 | 0 | 0 | 0 | | |
| 20 | 3.2 | 4 | 3 | 2 | 1 | 0 | 0 | 0 | | |
| 21 | 2.7 | 3 | 2 | 1 | 0 | 0 | 0 | 0 | | |
| 22 | 2.5 | 3 | 2 | 1 | 0 | 0 | 0 | 0 | | |
| 23 | 2.3 | 3 | 2 | 1 | 0 | 0 | 0 | 0 | | |
| TOTAL | 74.5 | 85 | 61 | 39 | 21 | 8 | 0 | 0 | | |
| COSTS | | $ 5.10 | $ 4.38 | $ 3.78 | $ 3.42 | $ 3.36 | $ 3.60 | $ 4.32 | | |

FIG. 8

THIRD-PARTY NETWORK COMPUTING RESOURCE MANAGEMENT

BACKGROUND

In order to avoid building and maintaining its own servers, an enterprise may use a third-party network, also referred to as a cloud or datacenter, to deploy various applications and services to the enterprise's employees, clients, and customers. For instance, the enterprise may use on-demand computational resources from the third-party network, or the enterprise may reserve the right to use the computing resources in advance by way of a reserved instance (RI). On-demand computing resources offer the flexibility to increase or decrease in scale so that these resources match fluctuating needs of the enterprise, and often involve a pay-per-use model. On the other hand, computing resources purchased via a reserved instance often involve an agreement for computational resources across a specified term (e.g., 1 or 3 years) for particular payment (e.g., an upfront payment or a payment plan). The computing resources purchased via reserved instances are referred to herein as reserved computing resources. Because reserved computing resources are purchased in advance and for a longer duration, the third-party network typically offers reserved computing resources at a discount compared to on-demand computational resources.

When using reserved and on-demand computing resources, the enterprise might not be doing so in the most efficient fashion. In some cases, the enterprise may fail to reserve enough computing resources in advanced to cover its needs. As a result, the enterprise may pay higher costs for on-demand computing resources to make up for the shortage. Alternatively, the enterprise may reserve too many computing resources, which also results in the enterprise overpaying for these services.

SUMMARY

Embodiments presented herein overcome the aforementioned limitations by managing computational resources obtained from a third-party network based on the needs of the enterprise. By analyzing past usage of computational resources by an enterprise, adjustments can be made to the reserved and on-demand computational resources obtained from a third-party network to reduce cost.

Accordingly, a first example embodiment may involve a remote network management platform that includes a database containing records relating to (i) configuration information regarding units of reserved computing resources provided by a third-party network, and (ii) configuration information regarding units of on-demand computing resources provided by the third party network. A managed network is allocated an actual number of the units of reserved computing resources. The units of reserved computing resources relate to virtual machine instances within the third-party network. The remote network management platform further includes a server device (including one or more processors) disposed within a computational instance of the remote network management platform. The computational instance is associated with the managed network. In the first example embodiment, the server device is configured to obtain, from the third-party network, usage information for the managed network. The usage information represents a quantity of units of on-demand computing resources and utilization of the actual number of the units of reserved computing resources across one or more days. The server device is also configured to calculate an average usage of computing resources by the managed network for a particular hour-of-day across the one or more days of usage. The average usage of computing resources is calculated based on an average quantity of units of on-demand computing resources and an average utilization of the actual number of the units of reserved computing resources determined for the particular hour-of-day across the one or more days. The server device is further configured to determine, based on the configuration information regarding the units of reserved computing resources and the configuration information regarding the units of on-demand computing resources, a nominal number of units of reserved computing resources and a nominal number of units of on-demand computing resources that when combined satisfy the average usage of computing resources by the managed network for the particular hour-of-day, such that the nominal number of the units of on-demand computing resources is no more than a threshold value. The server device is further configured to change the actual number of the units of reserved computing resources that are allocated to the managed network to be the nominal number of the units of reserved computing resources.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B depicts the graph showing different combinations of reserved computing resources and on-demand computing resources that jointly satisfy the hourly average units of utilization by the managed network, in accordance with example embodiments.

FIG. 7G depicts the graph showing a sixth combination of reserved computing resources and on-demand computing resources that jointly satisfy the hourly average units of utilization by the managed network, in accordance with example embodiments.

FIG. 8 depicts a table that represents the different combinations of reserved computing resources and on-demand computing resources that jointly satisfy the hourly average units of utilization by the managed network, in accordance with example embodiments.

DETAILED DESCRIPTION

Figure 1:
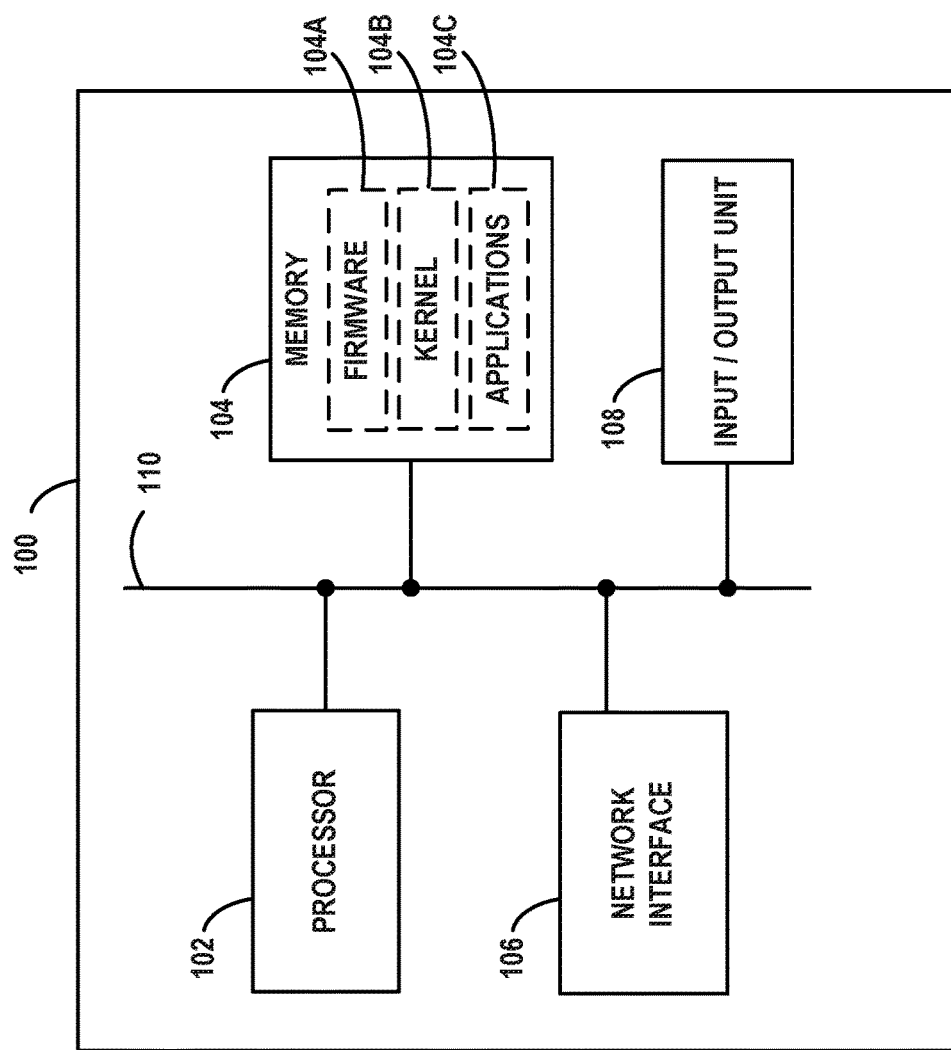
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
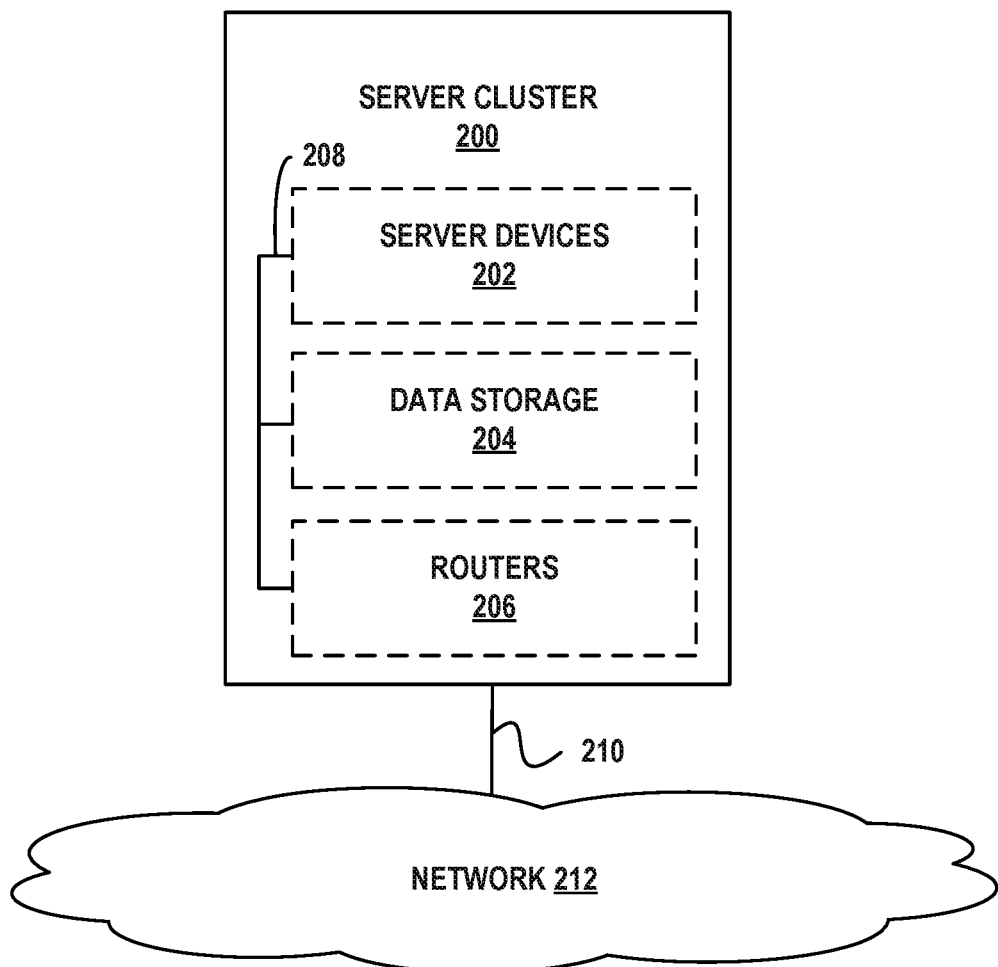
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
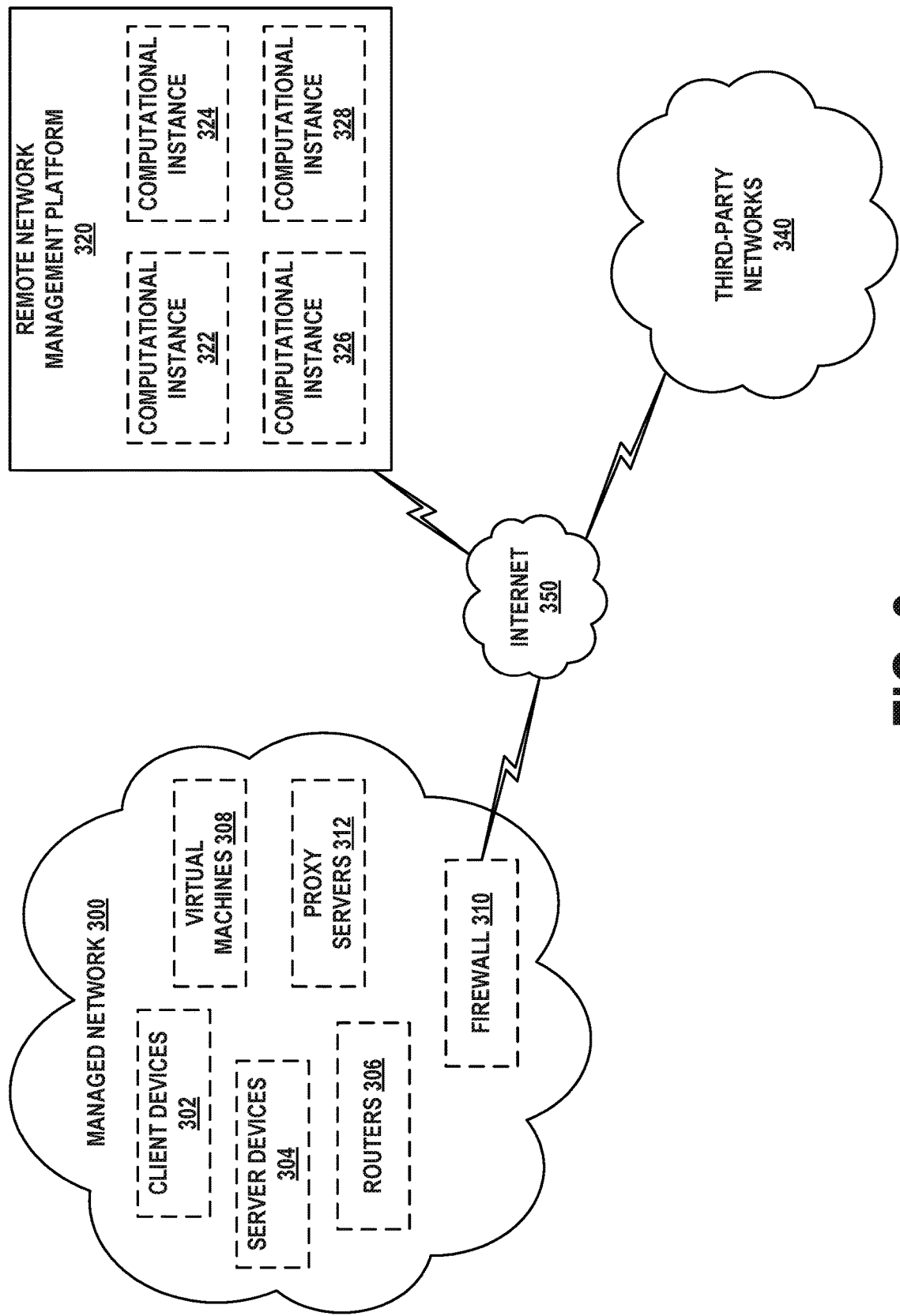
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an enterprise for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
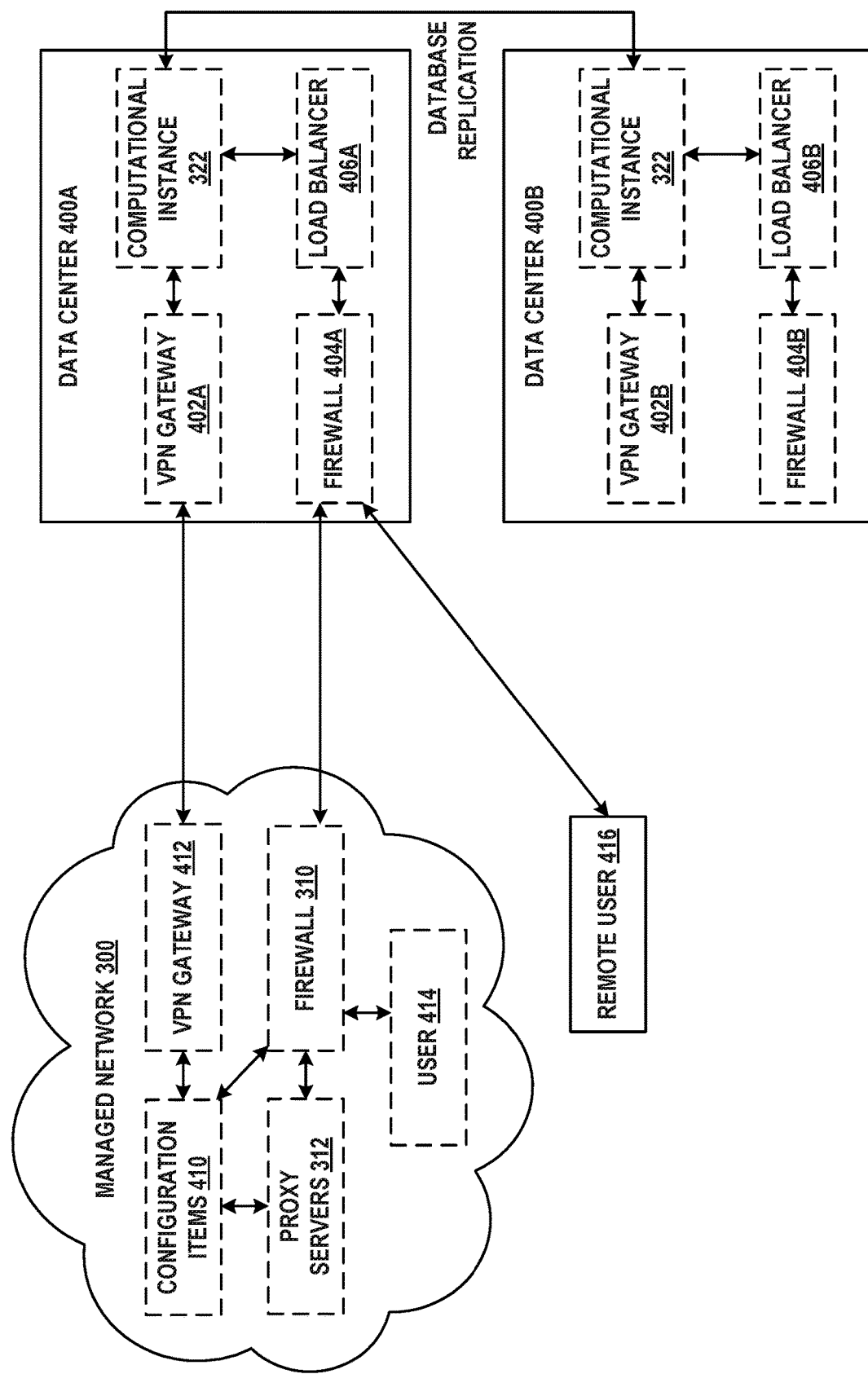
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
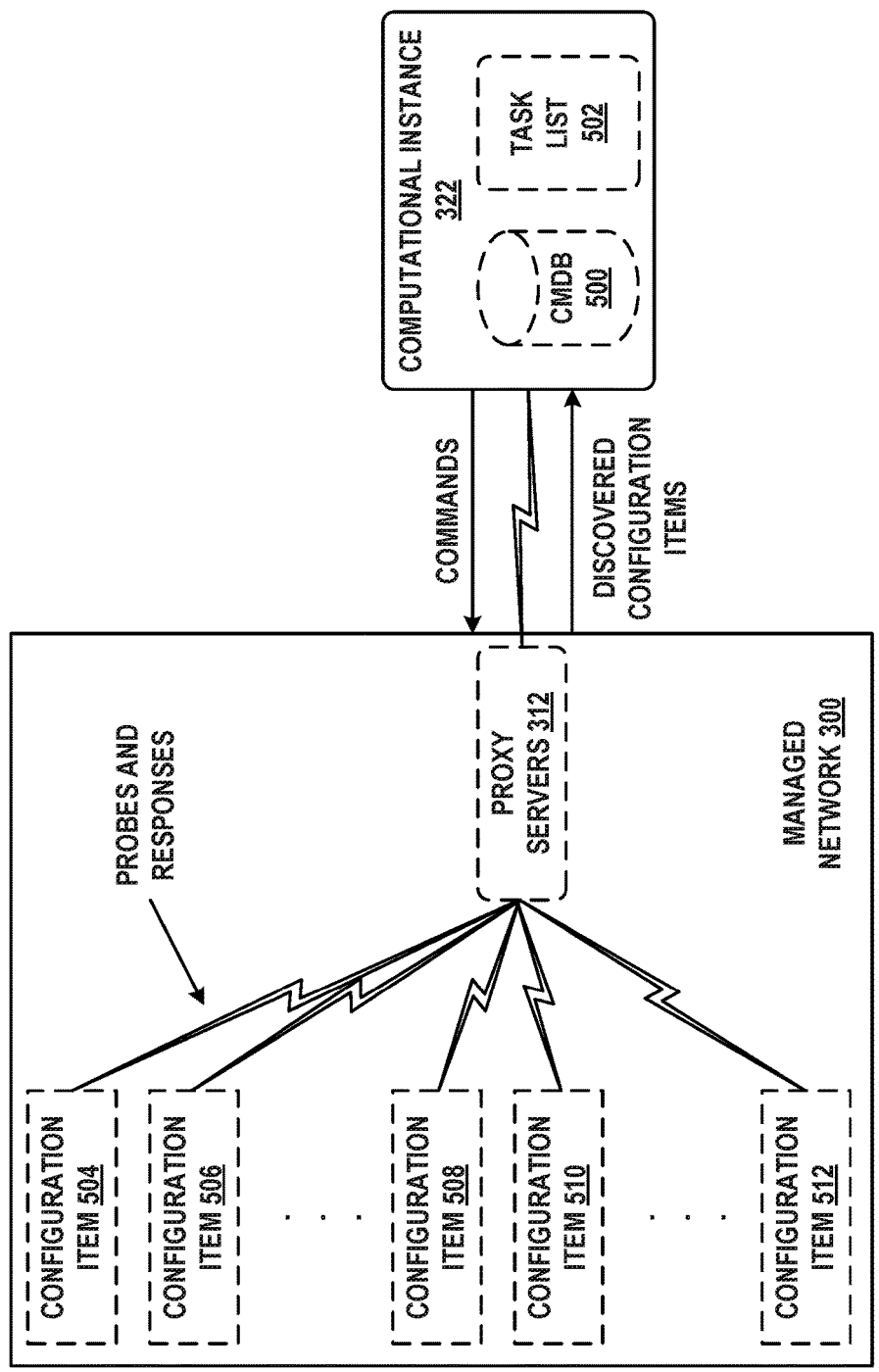
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
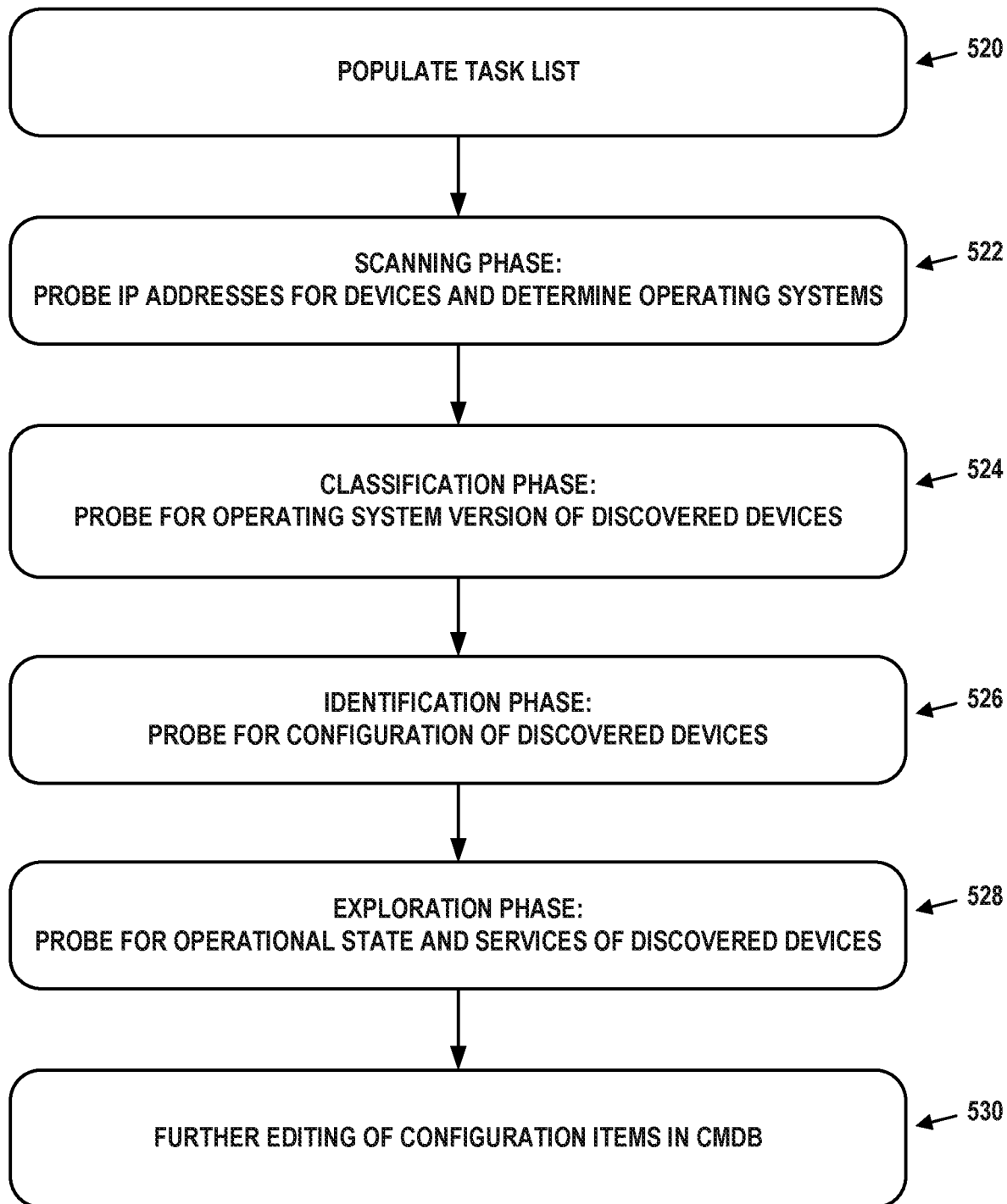
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE THIRD-PARTY RESOURCE UTILIZATION MEASUREMENT AND MANAGEMENT

Managed network 300 may use a third-party network for computing resources, such server devices may be configured to provide storage and/or deploy applications and services to client devices 302 and customers. The third-party network may also be referred to as a cloud or datacenter. As an example, managed network 300 may the computing resources of a third-party network to meet growing or fluctuating computational needs, document control and security, and to enable remote access to applications and services. The third-party provider may dynamically allocate computing resources for managed network 300. Examples of such computing resources may include processing power, data storage, and networking services, among others.

These managed resources may be grouped in blocks by the managed network 300. Each resource block may refer to a discrete amount of computational resources in a particular physical location and/or of a particular type (e.g., WINDOWS® servers, LINUX® servers). While the discussion herein centers on a single block of resources, the embodiments described may be applied to any arrangement of one or more blocks of any type.

Managed network 300 may obtain computing resources from the third-party in an on-demand fashion or by reserving the computational resources in advance (i.e., purchasing the computing resources via one or more reserved instances). When using computational resources on-demand, managed network 300 obtains the computational resources as needed. The third-party provider may monitor usage of computing resources allocated to managed network 300, which can enable the third-party provider to charge managed network 300 accordingly. For example, the third-party provider may charge managed network 300 based on a duration that managed network 300 used computational resources on-demand and/or based on a quantity of computational resources used on-demand. The manner in which the third-party provider measures usage may vary. As an example, when managed network 300 uses computational resources for processing, the third-party provider may measure a number of processor cores used. Alternatively, when managed network 300 uses computational resources for data storage, the third-party provider may measure the amount of data (e.g., gigabytes, terabytes, etc.) was allocated for storage.

When obtaining computational resources through reserved instances, managed network 300 may enter into an agreement with the third-party provider. The agreement may represent a quantity of computing resources reserved by managed network 300 over an agreed upon term (e.g., 1 year, 3 years) and may involve an upfront payment or a payment plan between managed network 300 and the third-party provider. The use of reserved computing resources by managed network 300 may depend on various factors, including an account maintained by the third-party provider, region of use by managed network 300, and instance type, among others.

The usage of computational resources by managed network 300 can vary depending on the time of day. In some cases, managed network 300 may only require access to certain resources during specific hours (e.g., hours of operation). Similarly, the computational needs of managed network 300 can fluctuate throughout the day or week depending on various factors, such as demand from client devices 302 or customers. As such, management network 300 may attempt to manage computing resources obtained from a third-party network in order to avoid unwanted costs. As explained in further detail below, managed network 300 may receive assistance from remote network management platform 320 regarding purchasing, selling, and otherwise managing computing resources obtained from one or more third-party providers.

Figure 6:
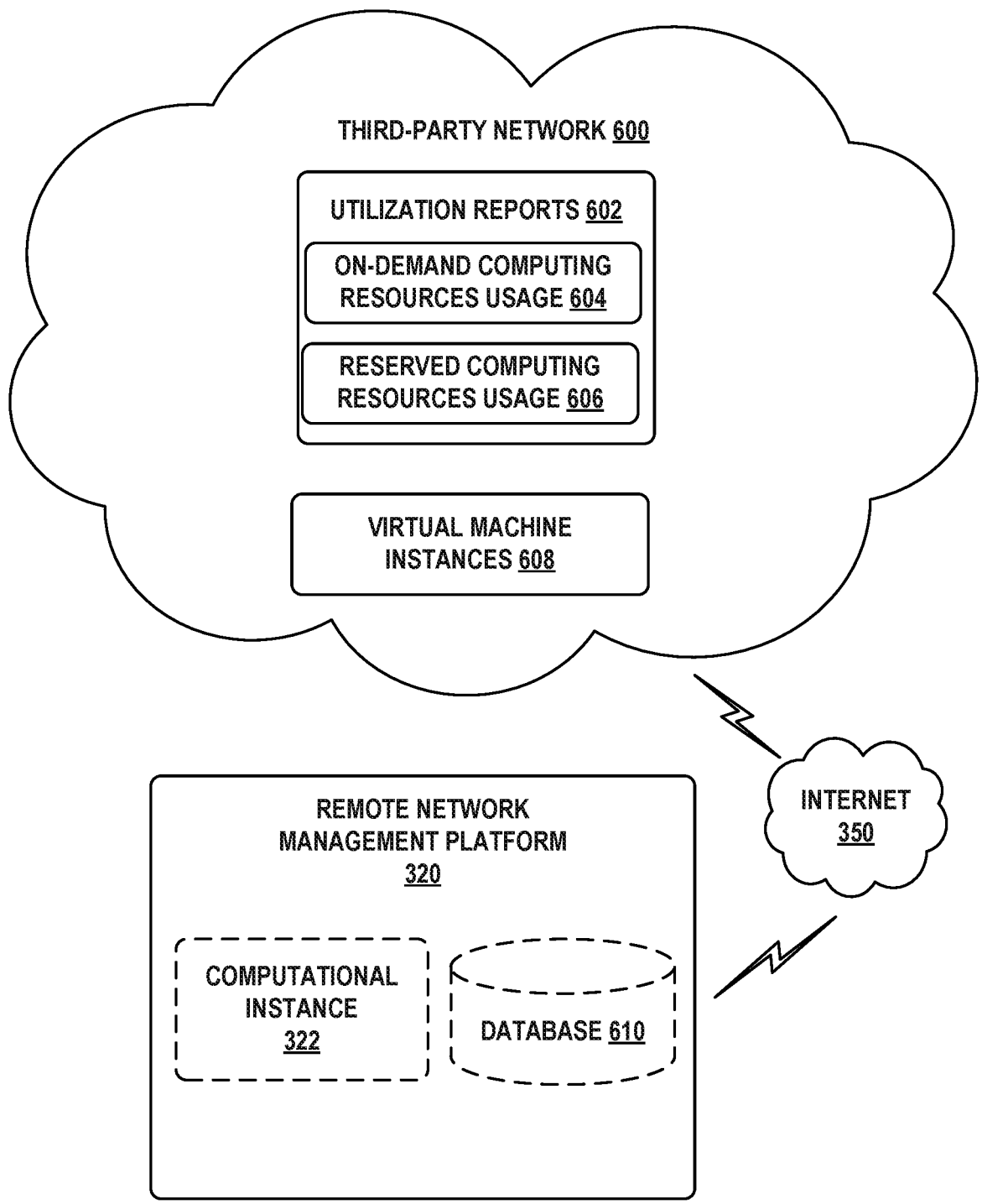
FIG. 6 depicts communication between a remote network management platform and a third-party network, in accordance with example embodiments.

FIG. 6 depicts communication between remote network management platform 320 and third-party network 600. As shown, remote network management platform 320 includes database 61- and computational instance 322.

Database 610 may contain records relating to configuration information regarding units of reserved computing resources and units of on-demand computing resources provided by third-party network 600. The reserved computing resources and the on-demand computing resources may relate to virtual machines instances within third-party network 600 and the records may include a first per-unit usage cost of the reserved computing resources and a second per-unit usage cost of the on-demand computing resources. Database 610 may also store an indication of the number of allocated units of reserved computing resources allocated to managed network 300. These computational resources may be any combination of processing, data storage, and/or communication resources.

Computational instance 322 may be associated with managed network 300 and can be used by remote network management platform 320 to manage computing resources for managed network 300. Computational instance 322 may include one or more processors configured to communicate with third-party network 600 and managed network 300. For example, a processor may communicate with third-party network 600 through internet 350 to obtain information regarding computing resources available from third-party network 600. The processors may be distributed across one or more server devices, and the term "server device" used herein may refer to multiple virtual or physical server devices.

A processor may obtain one or more utilization reports 602 regarding managed network 300 from third-party network 600. For example, the processor may transmit a request to third-party network 600 for utilization report 602. Alternatively, a processor may remotely access third-party network 600 and download one or more utilization reports. Utilization reports 602 may represent one or more days of on-demand computing resources usage 604 and reserved computing resources usage 606. For example, utilization reports 602 may provide usage of the reserved computing resources and the on-demand computing resources on an hourly basis.

Discovery of computing resource usage and other information from third-party network 600 can involve probing virtual machines of third-party network individually or probing a virtual machine controller to discover information regarding multiple virtual machines in third-party network 600. For example, remote network management platform 320 can access and obtain information, including price sheets and utilization reports 602 by probing a single virtual machine controller.

In addition, utilization reports 602 or another source from third-party network 300 (e.g., a price sheet) may include configuration information regarding on-demand computing resources and reserved computing resources, such as costs per units of computing resources available, types and locations of resources available, and other information regarding resources provided by third-party network 600. In response to receiving information within utilization report 602 or the other source (e.g., price sheet), remote network management platform 320 may update configuration information regarding one or both of reserved computing resources and on-demand resources in database 610.

On-demand computing resources usage 604 may represent usage of on-demand computing resources by managed network 300 across one or more days. As discussed above, on-demand computing resources can afford flexibility to managed network 300, including the ability to quickly scale cloud services up or down through the click of a button, an API call, or an enterprise rule.

Reserved computing resources usage 606 may represent usage of reserved computing resources by managed network 300 across one or more days. In some examples, reserved computing resources usage 606 may also indicate a number of units of reserved computing resources 614 allocated to managed network 300. For example, third-party network 600 may maintain an account for managed network 300 that indicates resources reserved under reserved instances by managed network 300. In some cases, managed network 300 may purchase reserved computing resources in advance to obtain the computing resources at a discounted price compared to a cost for on-demand computing resources.

Virtual machine instances 608 represent the reserve computing resources and the on-demand computing resources that third-party network 600 may allocate to managed network 300.

Figure 7A:
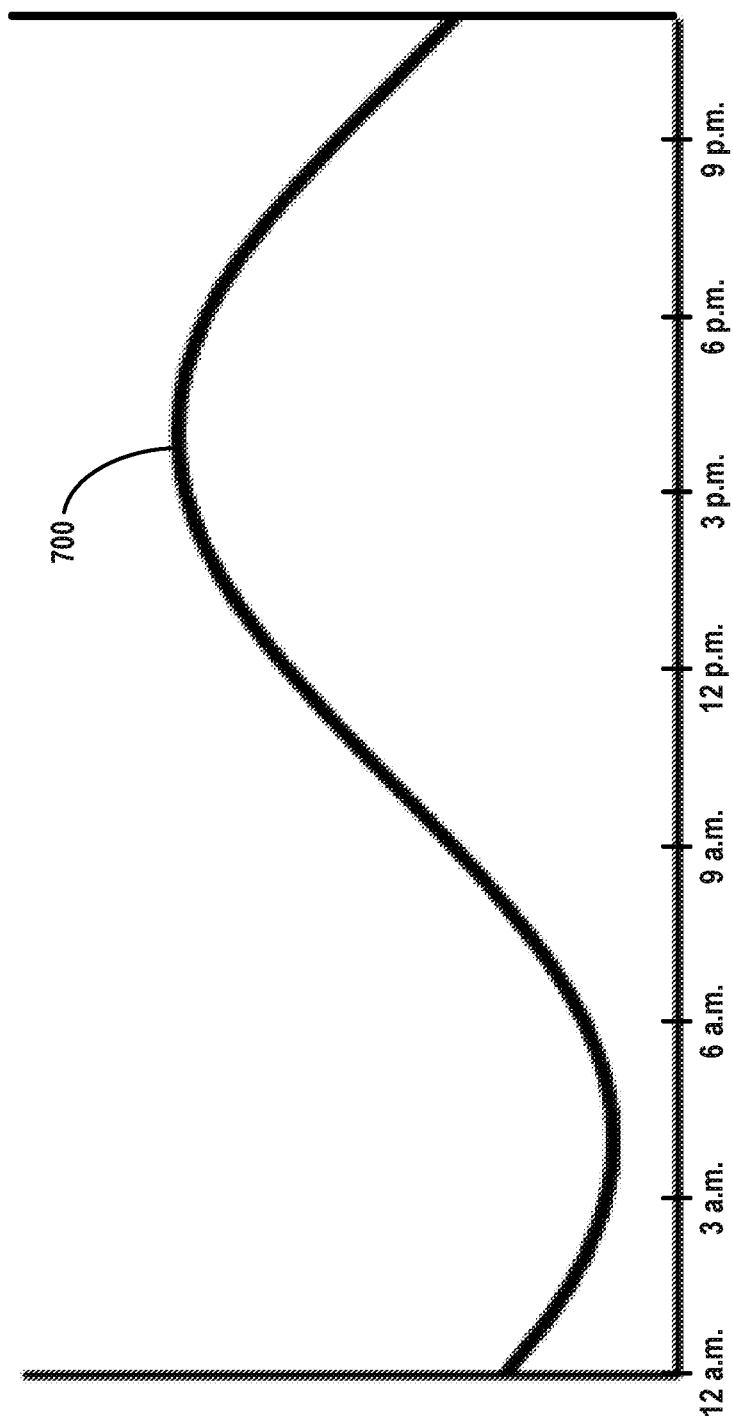
FIG. 7A depicts a graph showing a curve representative of hourly average units of utilization of the reserved computing resources and the on-demand computing resources used by a managed network for each hour-of-day across one or more days of usage, in accordance with example embodiments.

To further illustrate, the following scenario presented herein involves remote network management platform 320 managing computing resources obtained by managed network 300 from third-party network 600. In the scenario, FIG. 7A depicts a graph showing a curve 700 representative of hourly average units of utilization of the reserved computing resources and the on-demand computing resources used by managed network 300 for each hour-of-day across one or more days of usage. The hourly average units of utilization of computing resources by managed network 300 may be for various types of computing resources, such as processing power, data storage, or networking services. In some examples, third-party network 600 may measure usage by managed network 300 using other frames of reference. For example, third-party network 600 may group average units of utilization of computing resources by managed network 300 by resource characteristics, such as region of use, instance type, and type of usage, etc.

As discussed above, remote network management platform 320 may obtain utilization reports 302 regarding managed network 300 from third-party network 600. Utilization reports 302 may represent one or more days of usage of the reserved computing resources and the on-demand computing resources. For example, utilization reports 302 may represent usage of computing resources by managed network 300 across 7 days, 30 days, 60 days, etc. The days of usage represented by the utilization reports 302 may be adjusted.

Remote network management platform 320 may further calculate the hourly average units of utilization for each hour-of-day across the one or more days of usage by managed network 300 as represented by curve 700. As shown, managed network 300 may, on average, use the least amount of computing resources around 4:00 a.m., and the most computing resources around 4:00 p.m. Thus, computational demand curve 700 may reflect the difference between computing usage during operational and non-operational hours for managed network 300.

FIG. 7B depicts the graph showing a number of reserved computing resources that can be obtained by managed network 300 in order to the hourly average units of utilization represented by curve 700. More specifically, reserved computing resource unit 702, reserved computing resource unit 704, reserved computing resource unit 706, reserved computing resource unit 708, and reserved computing resource unit 710 correspond to units that managed network 300 may obtain to cover the hourly average units of utilization represented by curve 700.

In some examples, managed network 300 may use only on-demand computing resources to cover the hourly average units of utilization represented by curve 700. Using only on-demand computing resources, however, may result in managed network 300 misusing resources (i.e., paying too much for computing resources).

Remote network management platform 320 may be configured to calculate output values respectively associated with different combinations of the reserved computing resources and the on-demand computing resources that jointly satisfy the hourly average units of utilization by managed network 300. In other words, remote network management platform 320 may determine combinations of units of reserved computing resources and units of on-demand computing resources that provide sufficient computing resources for each of the hourly average units of utilization. For example, the output values may be based on a sum of m times the first per-unit usage cost plus n times the second per-unit usage cost. In particular, the m units of the reserved computing resources plus n units of the on-demand computing resources may satisfy the hourly average units of utilization by managed network 300. The variables m and n can take on different values for each of the output values, and may be constrained so that m+n equal some fixed value T for all combinations.

Figure 7C:
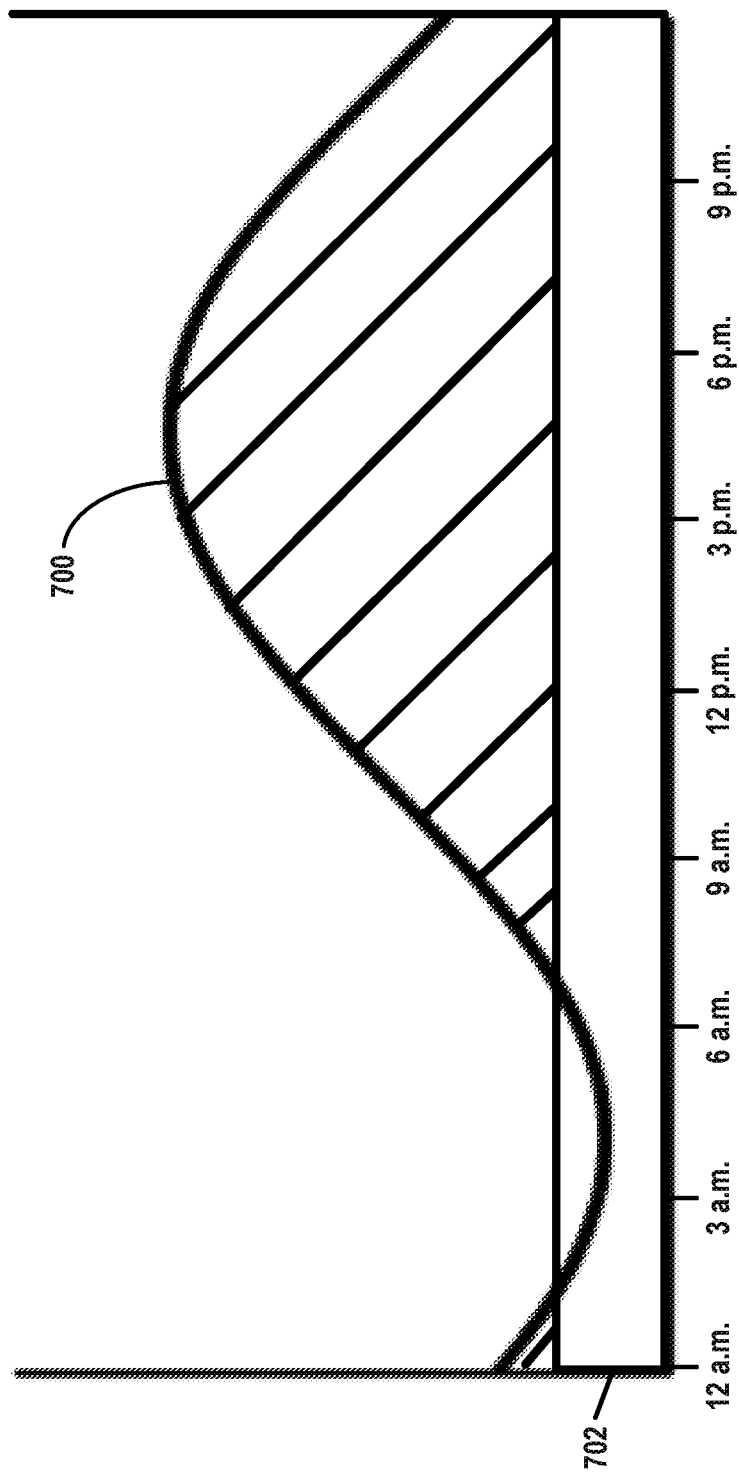
FIG. 7C depicts the graph showing a second combination of reserved computing resources and on-demand computing resources that jointly satisfy the hourly average units of utilization by the managed network, in accordance with example embodiments.

FIG. 7C depicts the graph showing a second combination of reserved computing resources and on-demand computing resources that jointly satisfy the hourly average units of utilization by the managed network. In particular, the combination shown includes reserved computing resource unit 702 and also shows areas under curve 700 that correspond to on-demand computing resources required to satisfy the hourly average units of utilization by the managed network. The first combination of reserved computing resources and on-demand computing resources that jointly satisfy the hourly average units of utilization may involve one unit of reserved resources and areas under curve 700 correspond to on-demand computing resources.

Figure 7D:
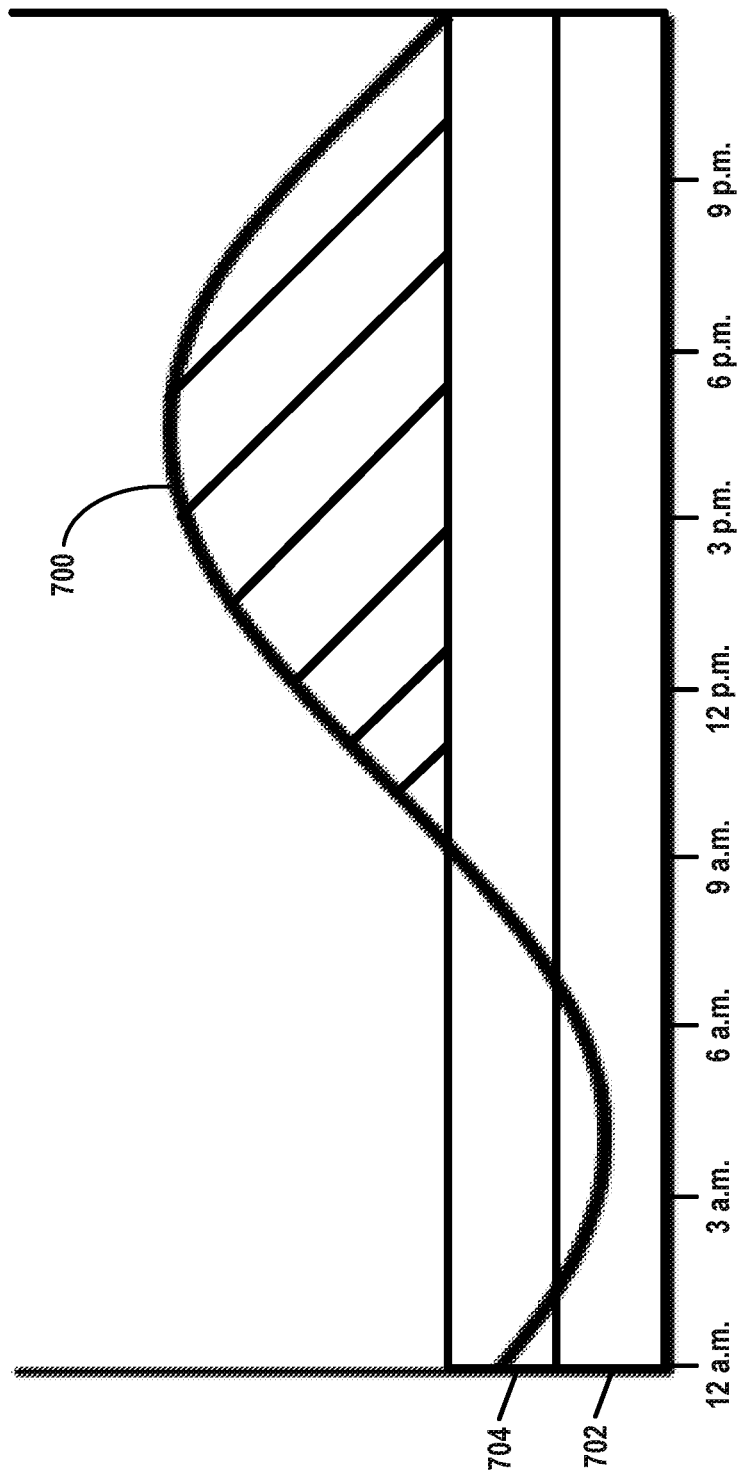
FIG. 7D depicts the graph showing a third combination of reserved computing resources and on-demand computing resources that jointly satisfy the hourly average units of utilization by the managed network, in accordance with example embodiments.

FIG. 7D depicts the graph showing a third combination of reserved computing resources and on-demand computing resources that jointly satisfy the hourly average units of utilization by the managed network. In particular, the combination shown includes two units of reserved computing resources and also shows areas under curve 700 that correspond to on-demand computing resources required to satisfy the hourly average units of utilization by the managed network.

Figure 7E:
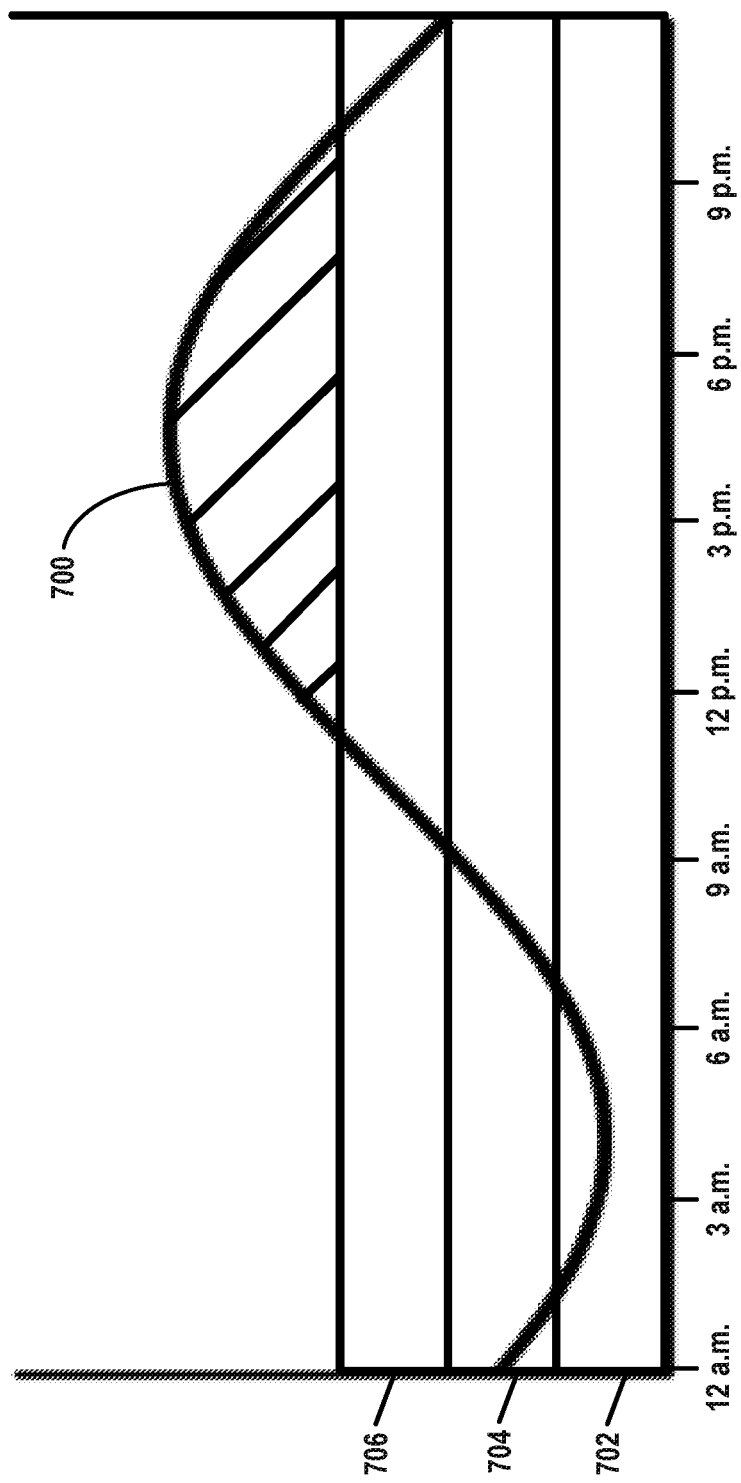
FIG. 7E depicts the graph showing a fourth combination of reserved computing resources and on-demand computing resources that jointly satisfy the hourly average units of utilization by the managed network, in accordance with example embodiments.

FIG. 7E depicts the graph showing a fourth combination of reserved computing resources and on-demand computing resources that jointly satisfy the hourly average units of utilization by the managed network. In particular, the combination shown includes three units of reserved computing resources and also shows areas under curve 700 that correspond to on-demand computing resources required to satisfy the hourly average units of utilization by the managed network.

Figure 7F:
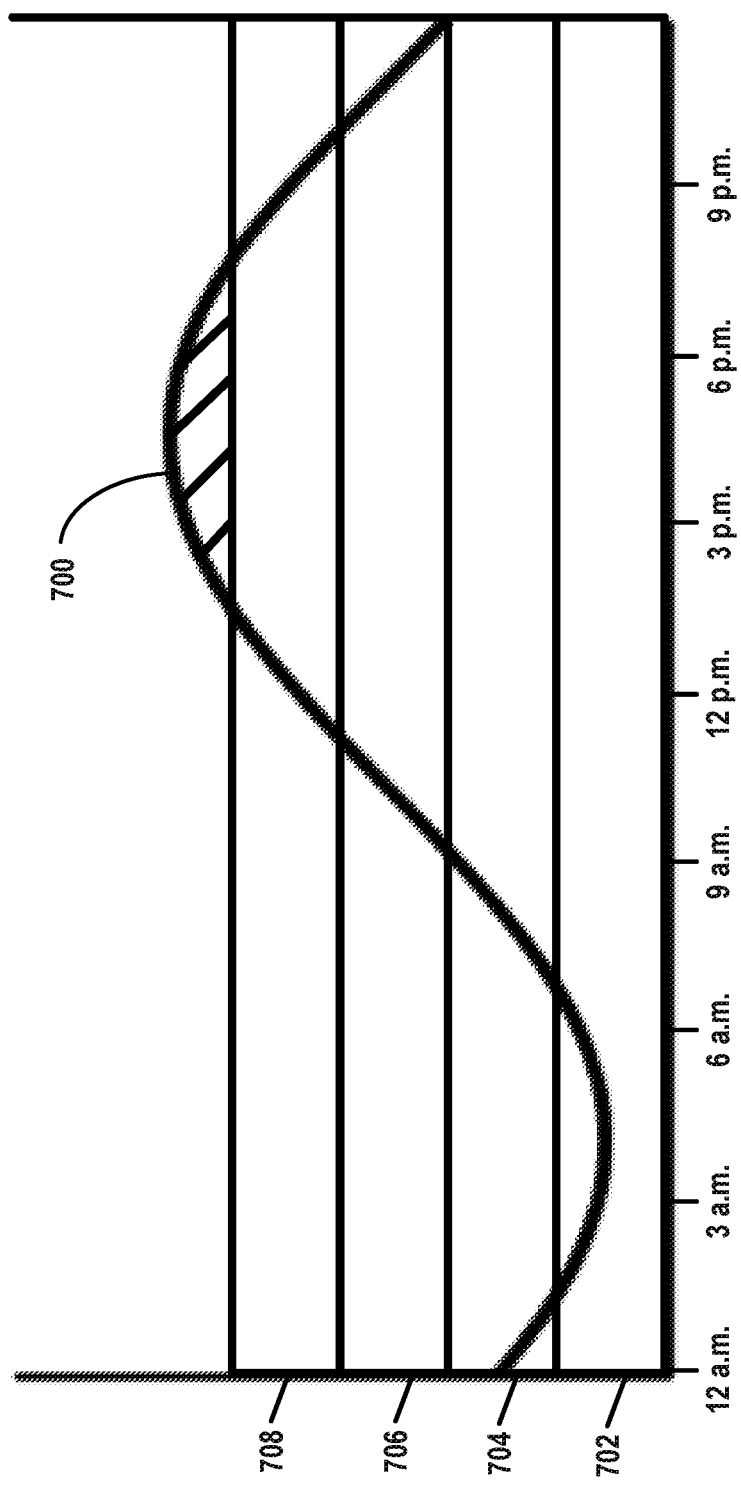
FIG. 7F depicts the graph showing a fifth combination of reserved computing resources and on-demand computing resources that jointly satisfy the hourly average units of utilization by the managed network, in accordance with example embodiments.

FIG. 7F depicts the graph showing a fifth combination of reserved computing resources and on-demand computing resources that jointly satisfy the hourly average units of utilization by the managed network. In particular, the combination shown includes four units of reserved computing resources and also shows areas under curve 700 that correspond to on-demand computing resources required to satisfy the hourly average units of utilization by the managed network.

FIG. 7G depicts the graph showing a fifth combination of reserved computing resources and on-demand computing resources that jointly satisfy the hourly average units of utilization by the managed network. In particular, the combination shown includes five units of reserved computing resources and also shows that there is no longer an area under curve 700 that requires on-demand computing resources to satisfy the hourly average units of utilization by the managed network.

FIG. 8 depicts a table that represents the different combinations of reserved computing resources and on-demand computing resources that jointly satisfy the hourly average units of utilization by the managed network. Remote network management platform 320 may develop table (or a functionally equivalent or similar representation) when calculating output values respectively associated with different combinations of the reserved computing resources and the on-demand computing resources that jointly satisfy the hourly average units of utilization by the managed network based on the hourly average units of utilization and the records in the database.

Column 802 of table 800 represents each hour-of-day. In other examples, column 802 may represent a portion of a day (e.g., less than 24 hours). Further, table 800 includes total row 824 that represents the number of units of on-demand computing resources in a given combination required to satisfy the hourly average units of utilization. Table 800 also includes costs row 826 that represents costs associated with each combination of reserved computing resources and on-demand computing resources. In the example depicted in table 800, a unit of reserved computing resources 820 costs $0.03 and a unit of on-demand computing resources 822 costs $0.06. As a result, a unit of reserved computing resource 820 costs half as much as a unit of on-demand computing resources 822 for managed network 300. These prices are used to simplify the example and can depend on various factors associated with the type of usage, location, time of use, and a term associated with use, among others.

Column 804 of table 800 represents the hourly average units of utilization of the reserved computing resources and the on-demand resources by managed network 300, calculated for each hour-of-day across one or more days of usage. As shown, the hourly average units of utilization can vary during the course of the day. For example, the hourly average units used by managed network 300 may be greater during operational hours compared to non-operational hours. Total row 824 indicates that the total hourly average units used by managed network 300 correspond to 74.5 units.

In some examples, column 804 of table 800 may represent the hourly average units for a particular profile associated with managed network 300. For example, the profile may relate to the particular usage of computing resources by managed network 300, such as an associated region of usage, instance type of usage, scope of usage, and type of resources used.

Column 806 of table 800 represents the first combination of the reserved computing resources and the on-demand computing resources that jointly satisfy the hourly average units of utilization used by managed network 300. As shown in FIG. 7B, the first combination only uses on-demand computing resources to satisfy the hourly average units of utilization used by the managed network. As shown in table 800, the first combination using only on-demand computing resources requires 85 units total (assuming units of on-demand computing resources are not divisible) to cover the average hourly demand by managed network 300, resulting in an overall cost of $5.10 total.

Column 808 of table 800 represents the second combination of the reserved computing resources and the on-demand computing resources that jointly satisfy the hourly average units of utilization used by the managed network. As shown in FIG. 7C, the second combination uses one unit of reserved computing resources across all 24 hours (24 units total) and 61 units of on-demand computing resources to satisfy the hourly average units of utilization used by the managed network. As shown in table 800, the second combination of reserved computing resources and on-demand computing resources costs $4.38 total.

Column 810 of table 800 represents the third combination of the reserved computing resources and the on-demand computing resources that jointly satisfy the hourly average units of utilization used by the managed network. As shown in FIG. 7D, the third combination uses two units of reserved computing resources across all 24 hours (48 units total) and 39 units of on-demand computing resources to satisfy the hourly average units of utilization used by the managed network. As shown in table 800, the third combination of reserved computing resources and on-demand computing resources costs $3.78 total.

Column 812 of table 800 represents the fourth combination of the reserved computing resources and the on-demand computing resources that jointly satisfy the hourly average units of utilization used by the managed network. As shown in FIG. 7E, the fourth combination uses 3 units of reserved computing resources across all 24 hours (72 units total) and 21 units of on-demand computing resources to satisfy the hourly average units of utilization used by the managed network. As shown in table 800, the fourth combination of reserved computing resources and on-demand computing resources costs $3.42 total.

Column 814 of table 800 represents the fifth combination of the reserved computing resources and the on-demand computing resources that jointly satisfy the hourly average units of utilization used by the managed network. As shown in FIG. 7F, the fifth combination uses 4 units of reserved computing resources across all 24 hours (96 units total) and 8 units of on-demand computing resources to satisfy the hourly average units of utilization used by the managed network. As shown in table 800, the fifth combination of reserved computing resources and on-demand computing resources costs $3.36 total.

Column 816 of table 800 represents the sixth combination of the reserved computing resources and the on-demand computing resources that jointly satisfy the hourly average units of utilization used by the managed network. As shown in FIG. 7G, the sixth combination uses 5 units of reserved computing resources across all 24 hours (120 units total) to satisfy the hourly average units of utilization used by the managed network. The sixth combination does not require the use of any on-demand computing resource and costs $3.60 total.

Column 818 of table 800 represents yet another combination that only uses reserved computing resources (i.e., 6 units of reserved computing resources). As reflected in the $4.32 cost, this combination represents on overpayment for reserved computing resources.

Using table 800, remote network service platform 320 may select an allocation of the reserved computing resources that is within a threshold minimum output value of the output values. As shown in table 800, the fifth combination represented in column 814 involving 4 units of reserved computing resources and 8 units of on-demand computing resources costs the least to satisfy the hourly average units of utilization by managed network 300. Further, at 4 units of reserved computing resources, the 8 units of on-demand computing resources are no more than a threshold value. The threshold value may reduce cost for managed network 300 by lowering the computing resources used by managed network 300 at the on-demand price.

As a result, remote network service platform 320 may change the number of units of reserved computing resources allocated to managed network 300 to 4 units to lower costs for managed network 300. By selecting the fifth combination, remote network service platform 320 may select the allocation of reserved computing resources that is the minimum output value of the output values calculated using table 800.

In some examples, remote network service platform 320 may change the number of the allocated units to be the selected allocation of the reserved computing resources by remotely accessing the third party network and communicating with the third-party network to acquire or release some amount of the allocated units. For example, when the selected allocation of the reserved computing resources is less than the number of the units already allocated to managed network 300, remote network service platform 320 may release some amount of the allocated units and use units of the on-demand computing resource in place of the released allocated units. Alternatively, when the selected allocation of the reserved computing resources is more than the number of the allocated units, remote network service platform 320 may add some amount to the allocated units, and reduce usage of on-demand computing resources by an extent commensurate with the additional allocated units.

This ability to automatically modify the allocations of reserved and on-demand computing resources provides the improvements of more flexibility for managed network 300 and reduced excess allocations of reserved computing resources. For instance, rather than reserving 5 units of computing resources for each hour of the 24-hour period, a combination of fewer reserved units and some on-demand units can result in fewer overall units of computing resources being used, while still meeting the performance requirements of managed network 300. Furthermore, reserved computing resources that are allocated but not used for certain hours of the day are wasted. The embodiments herein reduce this wastage by not requiring managed network 300 to constantly maintain reserved computing resources to meet the demand of its busiest hour-of-day.

In some examples, remote network management platform 320 may further incorporate additional information regarding reserved and on-demand computing resources. For example, remote network management platform 320 may analyze operating software, location (e.g., region), profiles, family, size, platform, tenancy, and other considerations when managing and changing computing resources used by managed network 300. In additional examples, remote network management platform 320 may analyze computing resource allocation and use by managed network 300 according to regions. Similarly, remote network management platform 320 may adjust computing resource usage by managed network 300 based on licenses and/or sizes associated with units of reserved and on-demand computing resources.

In another example, remote network management platform 320 may adjust computing resources allocated to managed network 300 according to different coverage zones (e.g., locations of use). Remote network management platform 320 may subtract units of reserved computing resources assigned to managed network 300 in a first zone and reassign the subtracted units to usage by managed network 300 in a second zone. As a result, remote network management platform 320 may rebalance computing resources based on costs and needs per location of managed network 300. Rebalancing reserved computing resources may enable managed network 300 to lower costs while using computing resources according to needs within geographic regions. In some cases, remote network management platform 320 may rank zones requiring computing resources and reserve computing resources according to the ranking. The ranking may be based on various factors, such as customer needs associated with each zone, use of resources by each zone, and cost associated with supplying each zone with computing resources, among others. When computing resources are spread over multiple time zones, remote network management platform 320 may allocate excess capacity from computing resources in one time zone to requests that would normally be served by computing resources in another time zone. This may be done only at certain periods of the day so that remote network management platform 320 can make use of existing reserved computing resource capacity rather than allocate on-demand computing resource capacity.

In further examples, remote network management platform 320 may manage usage of computing resources according to different profiles of managed network 300. In particular, managed network 300 may include multiple profiles (e.g., organizations) that each have specific needs for computing resources. Remote network management platform 320 may manage and adjust units of reserved and on-demand computing resources for each profile. As such, remote network management platform 320 may manage and reduce costs associated with computing resource usage by profiles within managed network 300. Remote network management platform 320 may further aggregate costs and usage across the different profiles to determine totals for groups of profiles or the entirety of managed network 300.

Figure 9:
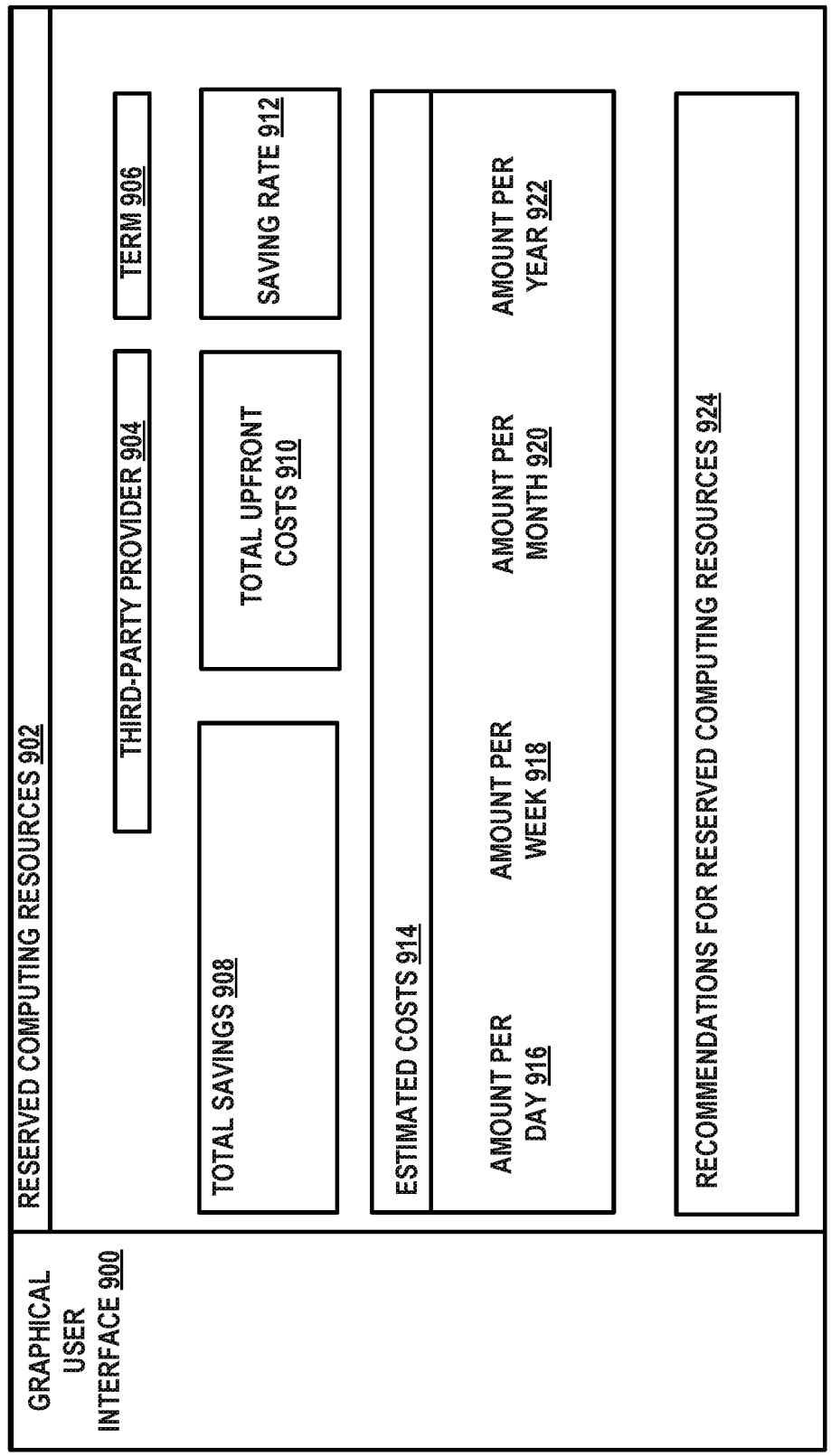
FIG. 9 depicts a graphical user interface for displaying computing resource information, in accordance with example embodiments.

FIG. 9 depicts a graphical user interface for displaying computing resource information. Graphical user interface 900 represents an example representation that remote network management platform 320 may generate and provide for display on client device 302 or another device of managed network 300. In some examples, remote network management platform 320 may generate and provide graphical user interface 900 for review by an administrator of managed network 300. Remote network management platform 320 may manage computing resources of managed network 300 according to instructions provided by the administrator.

Graphical user interface 900 may represent information associated with the management and usage of computing resources by managed network 300. Graphical user interface 900 includes items related to reserved computing resources 902, third-party provider 904, term 906, total savings 908, total upfront costs 910, saving rate 912, estimated costs 914, and recommendations for reserved computing resources 924. The items represented in graphical user interface 900 are for illustrative purposes and may include other items in different arrangements within other graphical user interface examples.

Reserved computing resources 902 may represent a header that conveys the type of computing resources displayed in graphical user interface 900. Graphical user interface 900 may also display information related to on-demand computing resources used by managed network 900, such as costs and usage trends.

Third-party provider 904 may represent a drop down menu that depicts which provider is associated with the displayed information. As such, graphical user interface 900 may represent computing resource allocation and usage by managed network 300 from different third-party providers. For example, graphical user interface 900 may display costs and recommendations for different third-party providers.

Term 906 may represent different term options associated with reserving computing resources. For example, term 906 may represent costs for computing resources purchased at a 1 year term rate and at a 3 year term rate. Total savings 908 may represent information related to the savings accrued by managed network 300 by using reserved computing resources 902.

Total upfront costs 910 may represent the amount owed by managed network 300 for recommended reserved computing resources. Saving rate 912 may represent an amount managed network 300 may save as a result of purchasing the recommended units of reserved computing resources. As a result, an administrator may view the total cost associated with reserving the recommended amount of reserved computing resources.

Estimated costs 914 may represent a breakdown of the costs associated with purchasing recommended units of reserved computing resources. In particular, estimated costs 914 may break down the costs by amount per day 916, amount per week 918, amount per month 920, and amount per year 922 to illustrate costs across different time frames.

Recommendations for reserved computing resources 924 may include information related to the management of computing resources for managed network 300. For example, remote network management platform may indicate a quantity of units of reserved computing resources that managed network 300 can purchase to minimize cost based on the hourly average units of utilization of computing resources by managed network 300.

VI. EXAMPLE OPERATIONS

Figure 10:
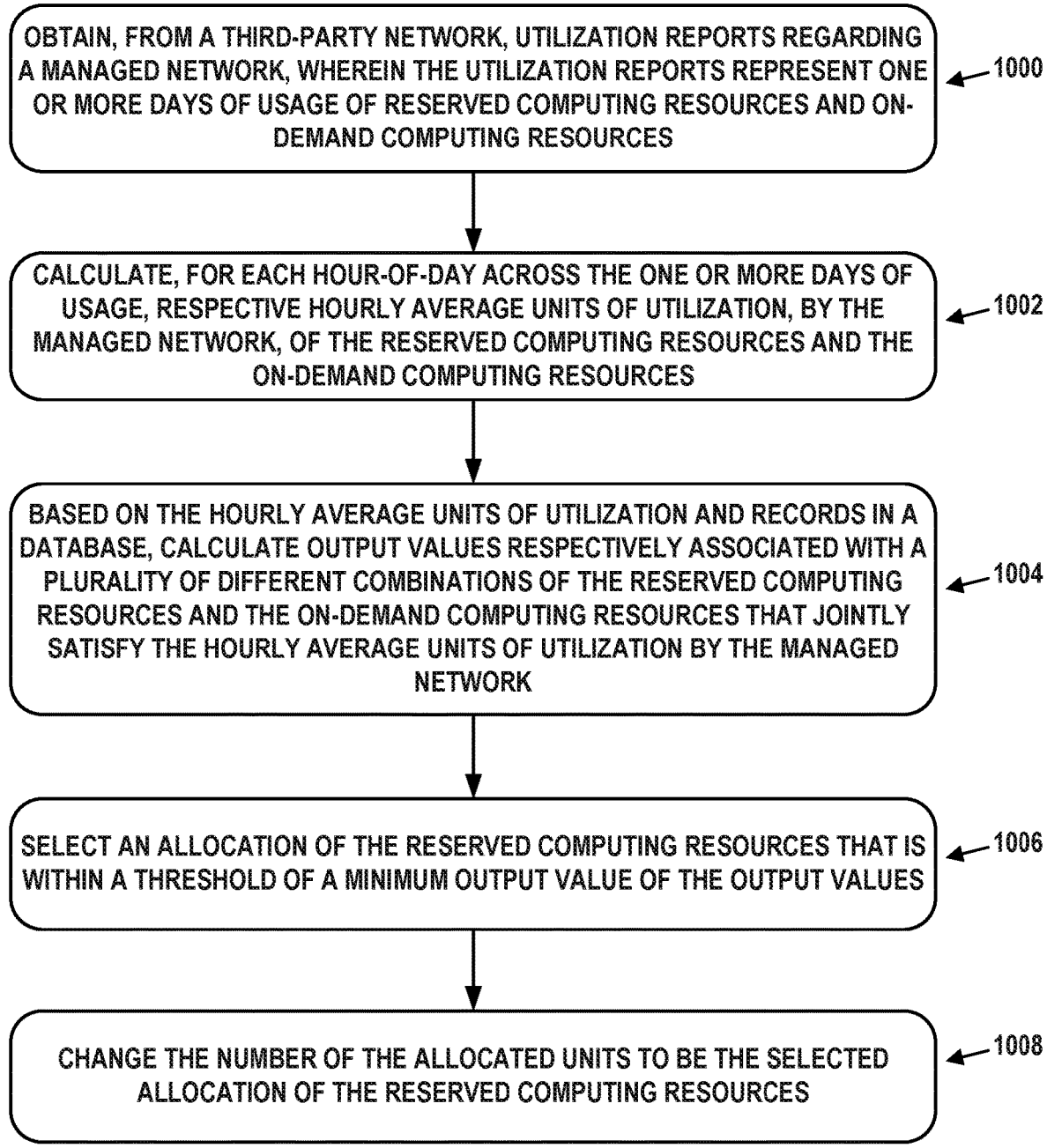
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

These embodiments may be generally directed to balancing usage of computing resources between units of reserved computing resources provided by a third-party network and units of on-demand computing resources provided by the third-party network. The computing resources may relate to virtual machine instances (or other units of computation and/or storage) within the third-party network. A managed network may be provided with a number of allocated units of the reserved computing resources.

Block 1000 may involve obtaining, from the third-party network, utilization reports regarding the managed network, where the utilization reports represent one or more days of usage of the reserved computing resources and the on-demand computing resources.

Block 1002 may involve calculating, for each hour-of-day across the one or more days of usage, respective hourly average units of utilization, by the managed network, of the reserved computing resources and the on-demand computing resources.

Block 1004 may involve, possibly based on the hourly average units of utilization and the records in the database, calculating output values respectively associated with a plurality of different combinations of the reserved computing resources and the on-demand computing resources that jointly satisfy the hourly average units of utilization by the managed network.

Block 1006 may involve selecting an allocation of the reserved computing resources that is within a threshold of a minimum output value of the output values.

Block 1008 may involve changing the number of the allocated units to be the selected allocation of the reserved computing resources.

In some embodiments, selecting the allocation of the reserved computing resources involve selecting allocation of the reserved computing resources that is the minimum output value of the output values.

In some embodiments, units of the reserved computing resources are associated with a first per-unit usage cost of the reserved computing resources, and units of the on-demand computing resources are associated with a second per-unit usage cost of the on-demand computing resources. The output values may be based on a sum of m times the first per-unit usage cost plus n times the second per-unit usage cost, where m units of the reserved computing resources plus n units of the on-demand computing resources satisfy the hourly average units of utilization by the managed network, and where m and n take on different values for each of the output values.

In some embodiments, satisfying the hourly average units of utilization by the managed network comprises providing sufficient computing resources for each of the hourly average units of utilization.

In some embodiments, changing the number of the allocated units to be the selected allocation of the reserved computing resources involves remotely accessing the third party network, and communicating with the third-party network to acquire or release some amount of the allocated units.

In some embodiments, prior to changing the number of the allocated units, the selected allocation of the reserved computing resources may be less than the number of the allocated units. Changing the number of the allocated units to be the selected allocation of the reserved computing resources may involve releasing some amount of the allocated units, and using units of the on-demand computing resources in place of the released allocated units.

In some embodiments, prior to changing the number of the allocated units, the selected allocation of the reserved computing resources may be more than the number of the allocated units. Changing the number of the allocated units to be the selected allocation of the reserved computing resources may involve adding some amount to the allocated units, and reducing usage of on-demand computing resources by an extent commensurate with the additional allocated units.

In some embodiments, obtaining the utilization reports regarding the managed network involves remotely accessing the third-party network and downloading the utilization reports.

In some embodiments, the utilization reports provide usage of the reserved computing resources and the on-demand computing resources on an hourly basis.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
   a database containing records relating to units of reserved computing resources provided by a third-party network and units of on-demand computing resources provided by the third-party network, wherein the reserved computing resources and the on-demand computing resources relate to virtual machine instances within the third-party network, and wherein a managed network is provided with a number of allocated units of the reserved computing resources; and
   one or more processors disposed within a computational instance of the remote network management platform, wherein the computational instance is associated with the managed network, and wherein the one or more processors are configured to:
   obtain, from the third-party network, utilization reports regarding the managed network, wherein the utilization reports represent one or more days of usage of the reserved computing resources and the on-demand computing resources;
   calculate, for each hour-of-day across the one or more days of usage, respective hourly average units of utilization, by the managed network, of the reserved computing resources and the on-demand computing resources;
   based on the hourly average units of utilization and the records in the database, calculate output values respectively associated with a plurality of different combinations of the reserved computing resources and the on-demand computing resources that jointly satisfy the hourly average units of utilization by the managed network;
   select an allocation of the reserved computing resources that is within a threshold of a minimum output value of the output values; and
   change the number of the allocated units to be the selected allocation of the reserved computing resources.

2. The remote network management platform of claim 1, wherein selecting the allocation of the reserved computing resources comprises:
   selecting allocation of the reserved computing resources that is the minimum output value of the output values.

3. The remote network management platform of claim 1, wherein the records relating to units of the reserved computing resources include a first per-unit usage cost of the reserved computing resources, and wherein the records relating to units of the on-demand computing resources include a second per-unit usage cost of the on-demand computing resources.

4. The remote network management platform of claim 3, wherein the output values are based on a sum of m times the first per-unit usage cost plus n times the second per-unit usage cost, wherein m units of the reserved computing resources plus n units of the on-demand computing resources satisfy the hourly average units of utilization by the managed network, and wherein m and n take on different values for each of the output values.

5. The remote network management platform of claim 1, wherein satisfying the hourly average units of utilization by the managed network comprises providing sufficient computing resources for each of the hourly average units of utilization.

6. The remote network management platform of claim 1, wherein changing the number of the allocated units to be the selected allocation of the reserved computing resources comprises:
- remotely accessing, by the one or more processors, the third party network; and
- communicating, by the one or more processors, with the third-party network to acquire or release some amount of the allocated units.

7. The remote network management platform of claim 1, wherein, prior to changing the number of the allocated units, the selected allocation of the reserved computing resources is less than the number of the allocated units, and wherein changing the number of the allocated units to be the selected allocation of the reserved computing resources comprises:
- releasing some amount of the allocated units; and
- using units of the on-demand computing resources in place of the released allocated units.

8. The remote network management platform of claim 1, wherein, prior to changing the number of the allocated units, the selected allocation of the reserved computing resources is more than the number of the allocated units, and wherein changing the number of the allocated units to be the selected allocation of the reserved computing resources comprises:
- adding some amount to the allocated units; and
- reducing usage of on-demand computing resources by an extent commensurate with the additional allocated units.

9. The remote network management platform of claim 1, wherein obtaining the utilization reports regarding the managed network comprises:
- remotely accessing, by the one or more processors, the third-party network; and
- downloading, to the one or more processors, the utilization reports.

10. The remote network management platform of claim 1, wherein the utilization reports provide usage of the reserved computing resources and the on-demand computing resources on an hourly basis.

11. A computer implemented method for balancing usage of computing resources between units of reserved computing resources provided by a third-party network and units of on-demand computing resources provided by the third-party network, wherein the computing resources relate to virtual machine instances within the third-party network, and wherein a managed network is provided with a number of allocated units of the reserved computing resources, the method comprising:
- obtaining, from the third-party network, utilization reports regarding the managed network, wherein the utilization reports represent one or more days of usage of the reserved computing resources and the on-demand computing resources;
- calculating, for each hour-of-day across the one or more days of usage, respective hourly average units of utilization, by the managed network, of the reserved computing resources and the on-demand computing resources;
- based on the hourly average units of utilization and the records in the database, calculating output values respectively associated with a plurality of different combinations of the reserved computing resources and the on-demand computing resources that jointly satisfy the hourly average units of utilization by the managed network;
- selecting an allocation of the reserved computing resources that is within a threshold of a minimum output value of the output values; and
- changing the number of the allocated units to be the selected allocation of the reserved computing resources.

12. The computer-implemented method of claim 11, wherein selecting the allocation of the reserved computing resources comprises:
- selecting allocation of the reserved computing resources that is the minimum output value of the output values.

13. The computer-implemented method of claim 11, wherein units of the reserved computing resources are associated with a first per-unit usage cost of the reserved computing resources, and wherein units of the on-demand computing resources are associated with a second per-unit usage cost of the on-demand computing resources.

14. The computer-implemented method of claim 13, wherein the output values are based on a sum of m times the first per-unit usage cost plus n times the second per-unit usage cost, wherein m units of the reserved computing resources plus n units of the on-demand computing resources satisfy the hourly average units of utilization by the managed network, and wherein m and n take on different values for each of the output values.

15. The computer-implemented method of claim 11, wherein satisfying the hourly average units of utilization by the managed network comprises providing sufficient computing resources for each of the hourly average units of utilization.

16. The computer-implemented method of claim 11, wherein changing the number of the allocated units to be the selected allocation of the reserved computing resources comprises:
- remotely accessing the third party network; and
- communicating with the third-party network to acquire or release some amount of the allocated units.

17. The computer-implemented method of claim 11, wherein, prior to changing the number of the allocated units, the selected allocation of the reserved computing resources is less than the number of the allocated units, and wherein changing the number of the allocated units to be the selected allocation of the reserved computing resources comprises:
- releasing some amount of the allocated units; and
- using units of the on-demand computing resources in place of the released allocated units.

18. The computer-implemented method of claim 11, wherein, prior to changing the number of the allocated units, the selected allocation of the reserved computing resources is more than the number of the allocated units, and wherein changing the number of the allocated units to be the selected allocation of the reserved computing resources comprises:
- adding some amount to the allocated units; and
- reducing usage of on-demand computing resources by an extent commensurate with the additional allocated units.

19. The computer-implemented method of claim 11, wherein obtaining the utilization reports regarding the managed network comprises:
- remotely accessing the third-party network; and
- downloading the utilization reports.

20. A non-transitory computer-readable medium, operable for balancing usage of computing resources between units of reserved computing resources provided by a third-party network and units of on-demand computing resources provided by the third-party network, wherein the computing resources relate to virtual machine instances within the third-party network, and wherein a managed network is provided with a number of allocated units of the reserved computing resources, wherein the computer-readable medium has stored thereon program instructions that, upon execution by one or more processors, cause the one or more processors to perform operations comprising:

- obtaining, from the third-party network, utilization reports regarding the managed network, wherein the utilization reports represent one or more days of usage of the reserved computing resources and the on-demand computing resources;
- calculating, for each hour-of-day across the one or more days of usage, respective hourly average units of utilization, by the managed network, of the reserved computing resources and the on-demand computing resources;
- based on the hourly average units of utilization and the records in the database, calculating output values respectively associated with a plurality of different combinations of the reserved computing resources and the on-demand computing resources that jointly satisfy the hourly average units of utilization by the managed network;
- selecting an allocation of the reserved computing resources that is within a threshold of a minimum output value of the output values; and
- changing the number of the allocated units to be the selected allocation of the reserved computing resources.

\* \* \* \* \*